| United States Patent [19] | [11] | 4,379,052 |
|---|---|---|
| Stearns | [45] | Apr. 5, 1983 |

[54] COOLANT FILTER ASSEMBLIES

[75] Inventor: Earl J. Stearns, Fairfield, Conn.

[73] Assignee: Flush-O-Matic Corp., Fairfield, Conn.

[21] Appl. No.: 266,446

[22] Filed: May 22, 1981

[51] Int. Cl.³ .............................................. B01D 29/04
[52] U.S. Cl. ................................... 210/223; 210/459; 210/695; 210/790; 123/41.21
[58] Field of Search .............. 210/167, 222, 223, 459, 210/695, 790; 123/41.21, 41.23, 41.24, 41.55

[56] References Cited

U.S. PATENT DOCUMENTS

| 2,964,190 | 12/1960 | Smith | 210/222 |
| 3,540,528 | 4/1970 | Moon | 165/119 |
| 3,841,489 | 10/1974 | Combest et al. | 210/223 |
| 3,941,697 | 3/1976 | Johnson | 210/167 |
| 4,052,308 | 10/1977 | Higgs | 210/167 |
| 4,082,665 | 4/1978 | Schneider et al. | 210/167 |

*Primary Examiner*—Charles N. Hart
*Assistant Examiner*—Sharon T. Cohen
*Attorney, Agent, or Firm*—Cifelli, Frederick & Tully

[57] ABSTRACT

A coolant filter assembly for use in automotive cooling systems includes a filter cartridge having a perforated cartridge shell open at one end to admit coolant and filled with filter material to cleanse the coolant as it passes therethrough, the filter cartridge being removably mounted in an enlarged portion of the coolant path to the radiator inlet, thereby permitting coolant flow both through and around the filter cartridge. Perforations of the cartridge shell include openings in the end wall and openings in the cylindrical sidewall formed at an acute angle to enhance flow through the filter cartridge. Liners of fine filter material are located adjacent the inside wall of the cartridge shell, coarse fibrous filter material is provided in the central portion and magnetized particles are preferably deployed in the fibrous filter material. A filter cartridge housing is provided in two telescopically joined housing halves with the filter cartridge removably mounted therein. Each of the housing halves has an end connector tube for attaching the filter housing in the coolant flow path to the radiator inlet. Alternatively, the radiator inlet itself is enlarged and the filter cartridge mounted in the radiator inlet on a spider member permitting flow around the filter cartridge. The radiator inlet hose is provided with an enlarged end which fits over the enlarged radiator inlet and accommodates the filter cartridge.

27 Claims, 7 Drawing Figures

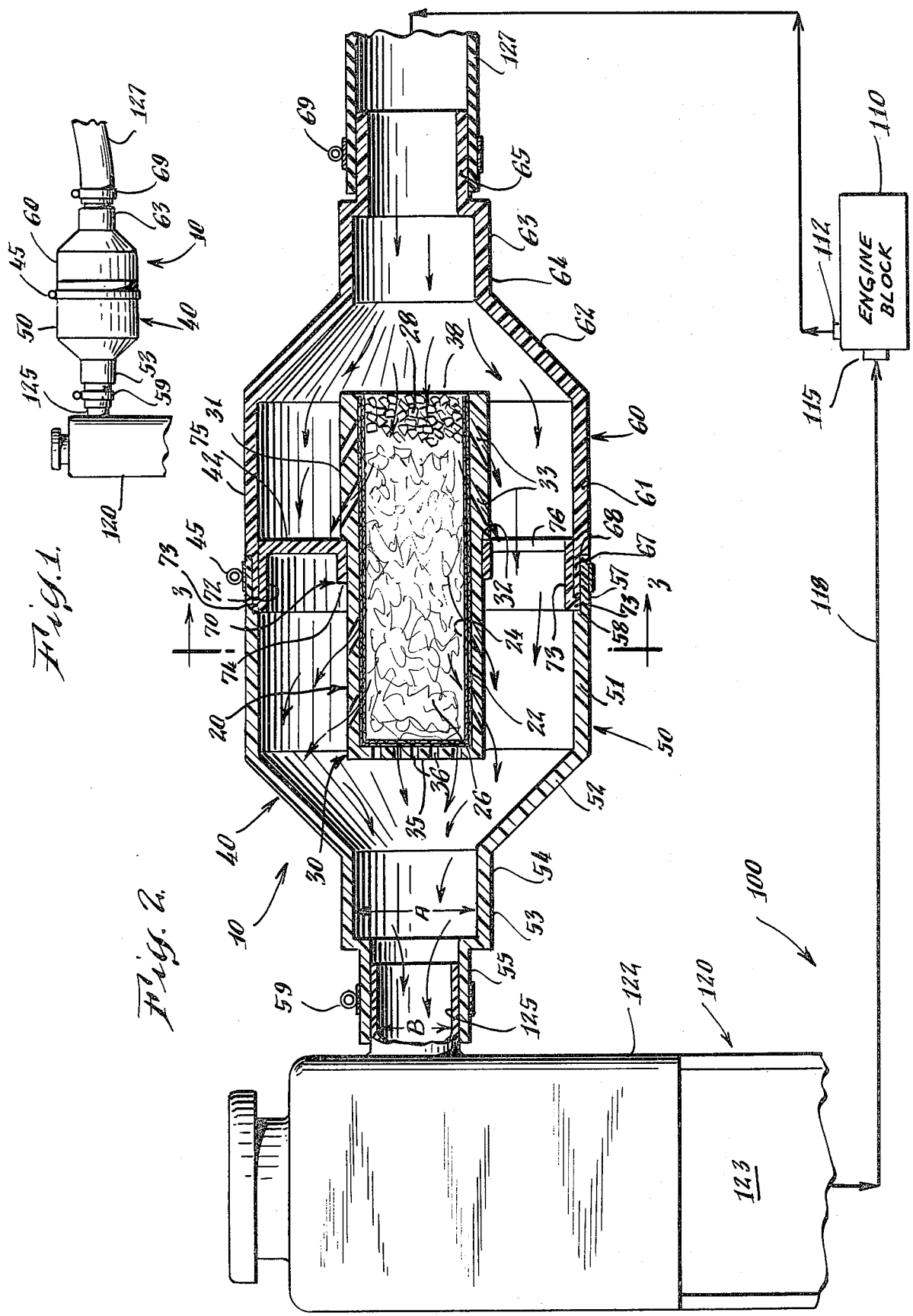

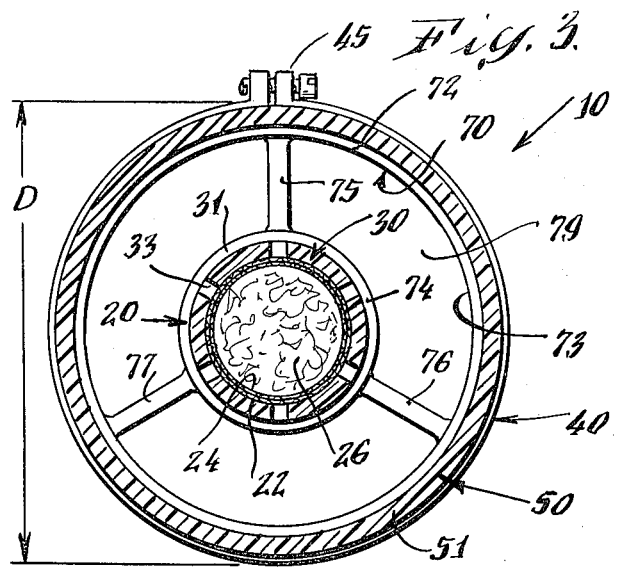
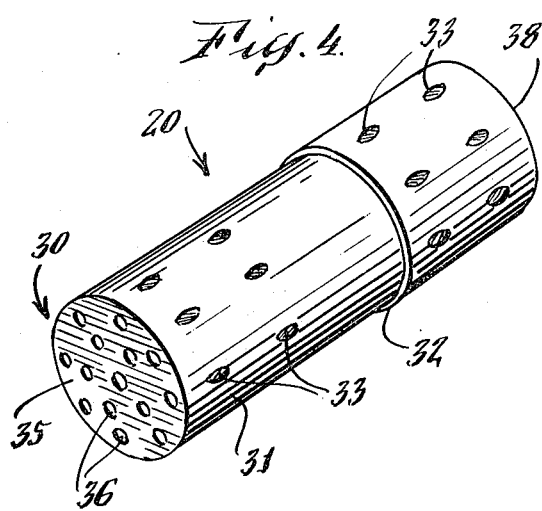
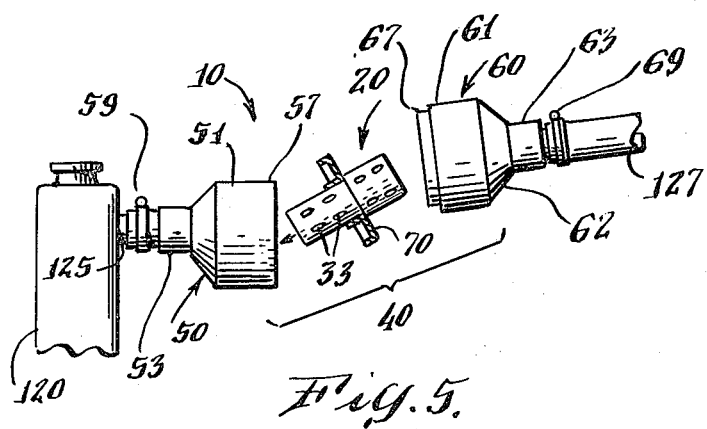
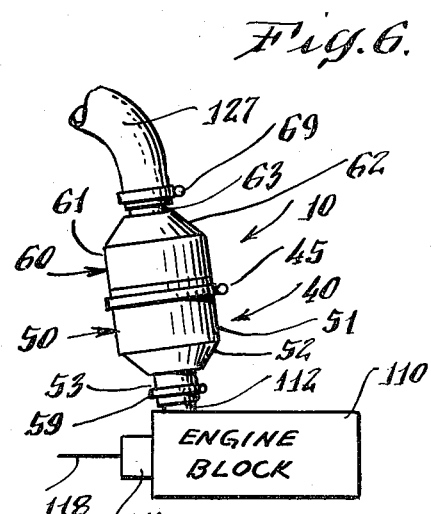
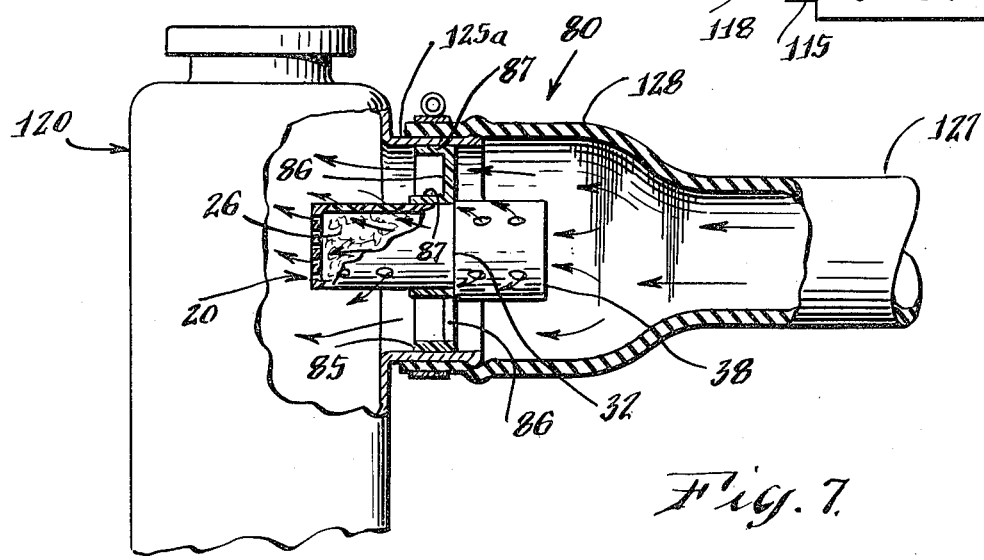

COOLANT FILTER ASSEMBLIES

BACKGROUND OF THE INVENTION

This invention relates to coolant filter assemblies for use in conjunction with liquid-cooled internal combustion engines, such as in automobiles.

Most automobiles utilize a water-cooled internal combustion engine and have a cooling system which includes passages in the engine block, a radiator, connecting hoses and a water pump. A heater is usually also included as a part of the cooling system. The term "water" is somewhat of a misnomer, inasmuch as modern automobile cooling systems employ a mixture of water and antifreeze, hereinafter collectively referred to as the coolant. The most common antifreeze has a base of ethylene glycol, and includes additives which inhibit corrosion and scale from forming in the cooling system, lubricate the water pump, and the like. In general, the manufacturers of automobiles and the manufacturers of antifreeze recommend that the cooling system be drained (and preferably flushed with a cleaning agent just prior to draining) and refilled with clean water and fresh antifreeze every year or at least every two years. This has been necessary for several related reasons. First, even though the ethylene glycol base of the antifreeze lasts indefinitely, the additives do not. When the additives break down, corrosion and rust begin in the cooling system and particles of rust and scale appear in the coolant itself. If the situation is not corrected, it will lead to blockage of the cooling passages and/or physical deterioration of the cooling system. Second, other foreign matter, such as oil, often finds its way into the coolant. As a result of these factors, the coolant eventually becomes dirty and the cooling system becomes inefficient and prone to costly failure.

However, there are problems created by changing the coolant at regular intervals. The antifreeze is a petroleum product, and petroleum is becoming scarce and expensive. It no longer makes sense to throw out coolant if it can be avoided. Also, there are environmental problems associated with regular changing of the coolant, particularly when the automobile owner drains the system and does not properly dispose of the old coolant. The most common transgression is to permit the coolant to run into storm sewers, through which it is carried into rivers, lakes or oceans, where it is detrimental from an ecological standpoint.

It is known to replenish the additives of the antifreeze, and products for this purpose have been and are still available at auto supply stores. However, to date such additives have generally been considered only as a booster between changes of the coolant and do not solve the problem of the coolant becoming dirty.

Proposals have been to filter the coolant within the confines of the cooling system, an example of which is found in Moon U.S. Pat. No. 3,540,528. The Moon U.S. Pat. No. 3,540,528 contemplates modifying the upper reserve tank of the radiator to mount filter medium therein, and to direct a portion of the coolant flow from the engine block through a separate hose to the filter medium. This system is obviously impractical for use with existing automobiles and is a complex solution even when applied to new vehicles. Johnson U.S. Pat. Nos. 3,941,697 and Higgs 4,052,308 propose introducing conical wire mesh filters within the radiator inlet hose, but the solution offered by these patents provides inefficient filtering and the possibility of blocking the entire cooling system if the mesh filter is not cleaned regularly, notwithstanding the small bypass opening provided in the Higgs 4,056,308 patent. Smith U.S. Pat. No. 2,964,190 proposes mounting a magnet in the radiator return hose for collecting rust or other ferromagnetic particles entrained in the coolant, but does not provide a general filter for the coolant.

Accordingly, there is a need for a coolant filter assembly which can be readily adapted to existing automobiles or to new automobiles in a cost efficient manner, and which will cleanse the coolant and permit, with the addition of additives, long term use of the coolant.

SUMMARY OF THE INVENTION

A coolant filter assembly according to the invention herein generally comprises a filter cartridge including a perforated cartridge shell open at one end to admit coolant and filled with filter material to cleanse the coolant as it passes therethrough and out the perforations of the cartridge shell, the filter cartridge being removably mounted in an enlarged portion of the coolant path to the radiator inlet, thereby permitting coolant flow both through and around the filter cartridge.

The cartridge shell is preferably cylindrical, having its open end deployed to receive coolant flow. Perforations of the cartridge shell include openings in the closed end wall and openings in the cylindrical sidewall, the latter openings being formed at an acute angle with respect to the direction of coolant flow, which enhances flow through the filter cartridge. One or more liners of relatively fine filter material are provided adjacent the inside wall of the cartridge shell, coarse fibrous filter material is provided in the central portion of the cartridge shell and magnetized particles are preferably deployed in the fibrous filter material near the inlet end of the filter cartridge to attract and hold magnetic particles.

In one embodiment, the coolant filter assembly further comprises a filter housing provided in two housing halves which are telescopically joined together. The joint is located in a larger diameter central portion of the filter housing, where the filter cartridge is removably mounted on a spider member with access for removing and replacing the filter cartridge being provided by separating the housing halves. The enlarged central portion of the filter housing and the spider member mounting the filter cartridge provide for coolant flow both through and around the filter cartridge so that the cooling system is not blocked even if the filter becomes clogged. Each of the housing halves has an end connector tube for attaching the filter housing in the coolant flow path to the radiator inlet, and more specifically, one of the end connector tubes may be attached to the radiator inlet and the other of the end connector tubes may receive the radiator inlet hose. The end connector tubes may have stepped diameters providing for mounting the filter cartridge to smaller diameter cooling systems generally employed in automobiles of Japanese manufacture and further providing for mounting the filter housing in larger diameter systems often used in cars of U.S. manufacture in which case the smaller diameter portions of the end connector tube are cut away prior to mounting.

In another embodiment, the radiator inlet itself is enlarged and the filter cartridge mounted in the radiator inlet on a spider member permitting flow around the filter cartridge. The radiator inlet hose is provided with an enlarged end which fits over the enlarged radiator inlet and accommodates the filter cartridge.

Accordingly, a principal object of the invention herein is to reduce the amount of service and expense necessary to maintain an automobile cooling system in efficient operating condition.

An additional object of the invention herein is to extend the useful life of antifreeze in an automobile cooling system.

A further object of the invention herein is to provide for maintaining an automobile cooling system in good operating condition without annual flushing and refilling of the system.

Another object of the invention herein is to provide a coolant filter apparatus for automobile cooling systems which will extend the useful life of coolant therein, simplify servicing thereof, and is easily installed in existing vehicles.

Other and more specific objects and features of the invention herein will in part be obvious and will in part appear from a perusal of the following description of the preferred embodiments and the claims, taken together with the drawings.

DRAWINGS

FIG. 1 is a side elevation view of a coolant filter assembly according to the invention herein installed at the radiator inlet of an automobile cooling system;

FIG. 2 is a longitudinal sectional view of the coolant filter assembly of FIG. 1;

FIG. 3 is a sectional view of the coolant filter assembly of FIG. 1 taken along the line 3—3 of FIG. 2;

FIG. 4 is a perspective view of the filter cartridge of the coolant filter assembly of FIG. 1;

FIG. 5 is a side elevation view of the coolant filter assembly of FIG. 1 illustrating the changing of its filter cartridge;

FIG. 6 is a schematic side elevation view showing an alternative mounting position of the coolant filter assembly of FIG. 1 in an automobile cooling system; and FIG. 7 is a side elevation view, partially in section, of another coolant filter assembly according to the invention herein.

The same reference numerals refer to the same elements throughout the various Figures.

DESCRIPTION OF PREFERRED EMBODIMENTS

A coolant filter assembly 10 according to the invention herein is shown in FIGS. 1-3, 5 and 6. The coolant filter assembly 10 generally comprises a filter cartridge 20 supported in a filter housing 40, with the filter housing 40 being attached to define a part of the coolant flow path through an automotive cooling system 100. FIG. 4 illustrates the filter cartridge 20 alone.

The automotive cooling system 100 is shown in part schematically in FIG. 2, and includes an engine block 110, a radiator 120, a water pump 115 mounted at the engine block for circulating coolant through the cooling system, and a radiator outlet hose 118 extending from the radiator outlet (not shown) to the water pump 115. It further includes a radiator inlet hose 127 connected between a thermostat 112 at the engine block 110 and, prior to installation of the coolant filter assembly 10, to a radiator inlet 125 in the upper reserve tank 122 of the radiator. When the automotive cooling system 100 is provided with a coolant filter assembly 10 according to the invention, the coolant filter assembly 10 is mounted in the flow path between the engine block and the radiator inlet. The automotive cooling system 100 also usually further comprises a heater, not shown.

The automotive cooling system is filled with coolant, which is a mixture of water and antifreeze having an ethylene glycol base which operates to prevent freezing of the coolant in cold temperatures and to raise the boiling point of the coolant above that of water alone, thereby preventing boilover and overheating in hot temperatures. The antifreeze also has additives to prevent the formation of rust and scale within the automotive cooling system, to lubricate the water pump, etc., as is well known.

The coolant filter assembly 10 according to the invention herein operates to keep the coolant clean and free of rust and scale particles which might clog the cooling system and particularly the core 123 of the radiator, so that with periodic changing of the filter cartridge 20 and replenishing of the additives, the coolant may be used for long periods of time.

The filter housing 40 is shown in FIGS. 1 and 2 being mounted in the automotive cooling system 10 between the radiator inlet tube 125 and the radiator inlet hose 127. The filter housing 40 has an enlarged central portion 42 having a diameter D (FIG. 3) which is substantially larger than the diameter of the radiator inlet hose, and the filter cartridge is mounted within the large central portion 42 as will be more fully discussed below. The filter housing is comprised of a first mounting half 50 and a second housing half 60 which are telescopically received with each other in overlapping relationship and secured together by a clamp 45. The first housing half 50 has a large cylindrical central portion 51, a tapered transition portion 52 and a stepped end connector tube 53. The stepped connector tube end 53 has a first tubular portion 54 having an inside diameter A and a tubular portion 55 having a smaller inside diameter B. The inside diameter A is chosen to fit over the radiator inlet tubes of radiators normally supplied in larger U.S. manufactured automobiles, and the inside diameter B is chosen to fit over the inlet tubes of smaller U.S. cars and most imported cars. In FIG. 2, the smaller diameter tubular portion 55 is shown installed on a smaller radiator inlet 125 and secured by clamp 59; however, if the radiator inlet were of larger diameter, the smaller diameter tubular portion 55 would be cut off and the larger diameter tubular portion 54 would be utilized for attachment to the radiator inlet. The central portion 51 of the first housing half 50 is provided with an outside skirt end 57 terminating at a ledge 58.

The second housing half 60 is similar, having a large cylindrical central portion 61, a tapered transition portion 62 and a stepped end connector tube 63, the stepped connector tube 63 being comprised of a larger diameter tubular portion 64 and a smaller diameter tubular portion 65 which are respectively sized to receive either a larger diameter or smaller diameter radiator inlet hose. The radiator inlet hose 127 is secured to the smaller diameter tubular portion 65 by clamp 69. The cylindrical central portion 61 terminates in an inside skirt end 67 with a ledge 68 formed adjacent thereto.

The outside skirt end 57 of the first housing half 50 and the inside skirt end 67 of the second housing half 60 are telescopically received in overlapping relationship and secured together by the clamp 45, as best seen in FIG. 2. The second housing half 60 is preferably fabricated of a relatively rigid material, such as nylon, which provides a good support against collapsing under the pressure of the clamp 45. The first housing half 50 may be fabricated of a softer plastic material, such as DuPont Hytrel or Nordel, which achieves a good pressure tight seal when clamped to the nylon of the second, more rigid housing half 50, and also stretches as required to fit over the radiator inlet 125.

The filter cartridge 20 is supported within the enlarged central portion 42 of the filter housing 40 by means of a spider member 70. The filter cartridge 20, shown in perspective in FIG. 4 and in section in FIG. 2, generally comprises a cartridge shell 30 having a cylindrical sidewall 31 and an endwall 35, the opposite end 38 being open to admit coolant. The cartridge shell 30 is perforated with a plurality of openings 36 disposed in the endwall 35 and a plurality of openings 35 in cylindrical sidewall 31 to provide for coolant exit from the cartridge shell. The openings 33 are disposed at an acute angle with respect to the direction of coolant flow which achieves a better coolant flow through these openings.

The filter cartridge 20 further comprises a first filter lining 22 of fine filter material, the filter lining 22 being fabricated generally in the shape of a cup and disposed adjacent the interior surfaces of the cylindrical sidewall 31 and endwall 35 of the cartridge shell 30. The fine filter lining 22 is adapted to filter out the smallest particles from the coolant. A medium filter lining 24 is preferably deployed inside the fine filter lining 22 for capturing medium sized particles. The central area of the filter cartridge is stuffed with a fibrous filter material 26, which acts as the coarse filter of the coolant filter assembly. In addition, it is preferable to employ a plurality of magnetized particles 28 within the fibrous filter material near the open end of the cartridge shell for attracting ferromagnetic particles from the coolant. The cartridge shell 30 is provided with a circumferential shoulder 32 disposed approximately midway along its length which facilitates mounting of the filter cartridge.

The spider member 70 comprises a cylindrical outer wall 72 sized to be received within the enlarged portion 40 of the filter housing 40, and an annular flange 73 extends outwardly from the cylindrical outer wall 72 and is received between the inside skirt end 67 of the second housing half 60 and the ledge 58 of the first housing half 50 to axially position the spider member 70 within the filter housing 40. The spider member 70 further comprises an inner tubular wall 74 which is connected to and supported with respect to the outer cylindrical wall 72 by radially extending arms 75–77. The filter cartridge 20 slides into the inner tubular wall 74 of the spider member until the circumferential shoulder 32 butts against the spider member with the filter cartridge 20 being held in position by a friction fit.

As best illustrated in FIG. 2, coolant from the engine block 110 is pumped through the radiator inlet hose 127 where it enters the filter housing 40. A substantial portion of the coolant flows into the open end 38 of the filter cartridge 20 where it is subjected to the filtering properties of the coarse fibrous filter material 26, the magnetized particles 28, the medium filter liner 24 and the fine filter lining 22, the coolant exiting the filter cartridge through the openings 33 and 36 of the cartridge shell 30. A portion of the coolant also flows around the filter cartridge 20, passing between the space 79 between the arms 75–77 of the spider member 70. Thus, if the filter cartridge 20 should become clogged, coolant flow through the cooling system is not blocked. In this regard, the cross-sectional flow area between the radial arms 75–77 around the filter cartridge is preferably approximately equal to the cross-sectional flow area of the radiator inlet 125 and radiator inlet hose 127.

As best illustrated in FIG. 5, the filter cartridge 20 is replaced periodically by removing the clamp 45 on the filter housing 40 and separating the first and second housing halves 50 and 60 of the filter housing 40. Then, the filter cartridge can be removed from the spider member 70 and a new filter cartridge inserted therein. The filter housing 40 is reassembled and the clamp 45 reinstalled. At the time the filter cartridge is changed, a new supply of additives may be added to the coolant. Thus, the life of the coolant can be prolonged over a substantial period of time by performing relatively simple maintenance.

With reference to FIG. 6, the coolant filter assembly 10 may also be mounted in the path of return flow of the coolant to the radiator by mounting the stepped connector tube 53 of the first housing half 50 to the thermostat outlet 112 at the engine block 110 and by mounting the radiator inlet hose 127 to the stepped outlet tube 63 of the second housing half 60. In FIG. 6, the larger diameter portions of the stepped end connector tubes are utilized in a larger diameter cooling system, the smaller diameter portions of the end tubes having been cut away. Inasmuch as the orientation of the filter housing 40 has been reversed, the filter cartridge is also reversed in the spider member 70 within the filter housing 40 wherein coolant flow enters the open end 38 of the filter cartridge.

The coolant filter assembly 10 may also be mounted at an intermediate point in the radiator return hose, with the mounting position being selected according to space availability within the engine compartment.

With reference to FIG. 7, a second coolant filter assembly 80 according to the invention herein is illustrated. The coolant filter assembly 80 is "built in" to the automotive cooling system at the factory, and more particularly, the radiator inlet 125a has a diameter approximately equivalent to the outside diameter of the filter housing 40 of the coolant filter assembly 10. A spider member 85 is mounted, preferably permanently, in the radiator inlet 125a, the spider member comprising one or more radial arms 86 supporting an inner tubular wall 87 which receives and supports the filter cartridge 20. The radiator inlet hose 127 is provided with an enlarged end portion 128, which fits over the enlarged radiator inlet 125a and accommodates the filter cartridge therein. The coolant filter assembly 80 may be serviced by merely removing the radiator inlet hose to gain access to the filter cartridge for changing it.

Accordingly, the preferred embodiments of coolant filter assemblies according to the invention herein described above admirably achieve the objects of the invention herein. It will be appreciated that various changes may be made from the preferred embodiments illustrated and described herein without departing from the spirit and scope of the invention, which is limited only by the following claims.

I claim:

1. A coolant filter assembly for use in an automobile cooling system including an engine block, a radiator, radiator outlet and inlet hoses and a pump for circulating the coolant therein, the coolant filter assembly comprising:

(A) a filter cartridge having a cartridge shell including a cylindrical sidewall and an endwall, the cartridge shell being open at one end to admit coolant and the cartridge shell being perforated with openings to permit coolant to exit, and filter material deployed within the cartridge shell for filtering coolant passing therethrough; and (B) means removably supporting the filter cartridge in the coolant inlet flow path to the radiator with the open end of the cartridge shell receiving the coolant flow, whereby the coolant filter assembly cleans the coolant and the filter cartridge can be removed and replaced when dirty, (C) said filter cartridge being sized and said supporting means being adapted to permit coolant flow both through and around the filter cartridge, whereby coolant flow is maintained if the filter cartridge becomes clogged.

2. A coolant filter assembly as defined in claim 1 wherein the filter cartridge is mounted in an enlarged portion of the coolant inlet flow path to the radiator.

3. A coolant filter assembly as defined in claim 1 wherein the radiator inlet is enlarged, the end of the radiator inlet hose secured to the radiator inlet is correspondingly enlarged to fit thereover, and the filter cartridge is supported in the enlarged radiator inlet.

4. A coolant filter assembly as defined in claim 3 wherein the filter cartridge is removably supported in the radiator inlet by a spider member comprising one or more arms extending radially inwardly from the radiator inlet and a tubular wall supported by the radial arms, the filter cartridge being encircled and removably supported by the tubular wall of the spider member.

5. A coolant filter assembly as defined in claim 4 wherein the cylindrical sidewall of the cartridge shell defines an annular shoulder which butts against the tubular wall of the spider member to position the filter cartridge within the spider member.

6. A coolant filter assembly as defined in claim 5 wherein the perforations of the cartridge shell comprise a plurality of openings in the endwall and a plurality of openings in the cylindrical sidewall, the openings in the cylindrical sidewall being inclined at an acute angle with the direction of coolant flow.

7. A coolant filter assembly as defined in claim 6 wherein the filter material comprises at least one filter liner deployed adjacent the inside walls of the cartridge shell and a fibrous coarse filter material deployed in the center of the cartridge shell.

8. A coolant filter assembly as defined in claim 7 wherein the filter material further comprises a plurality of magnetized particles deployed in the coarse fibrous filter material near the open end of the cartridge shell.

9. A coolant filter assembly as defined in claim 1 wherein the filter material comprises at least one filter liner deployed adjacent the inside walls of the cartridge shell and a fibrous coarse filter material deployed in the center of the cartridge shell.

10. A coolant filter assembly as defined in claim 9 wherein the filter material further comprises a plurality of magnetized particles deployed in the coarse fibrous filter material and near the open end of the cartridge shell.

11. A coolant filter assembly as defined in claim 1 wherein the perforations of the cartridge shell comprise a plurality of openings in the endwall and a plurality of openings in the cylindrical sidewall, the openings in the cylindrical sidewall being inclined at an acute angle with the direction of coolant flow.

12. A coolant filter assembly as defined in claim 11 wherein the filter material comprises at least one filter liner deployed adjacent the inside walls of the cartridge shell and a fibrous coarse filter material deployed in the center of the cartridge shell.

13. A coolant filter assembly as defined in claim 12 wherein the filter material further comprises a plurality of magnetized particles deployed in the coarse fibrous filter material near the open end of the cartridge shell.

14. A coolant filter assembly as defined in claim 1 wherein the means removably supporting the filter cartridge in the coolant inlet flow path comprises a filter housing including:

(1) first and second housing halves each comprising an end connector tube, a transition portion and a central portion, the housing halves being adapted for being removably attached together in a coolant tight seal with the central portions of the housing halves together forming a central portion of the filter housing which is enlarged with respect to the radiator inlet hose and the connector tubes being adapted to mount the filter housing in the cooling system with the coolant inlet flow path through the filter housing; and (2) a spider member comprising at least one arm extending radially inwardly from the assembled housing halves and removably supporting the filter cartridge in the central portion of the assembled housing halves, whereby coolant flow is established both through and around the filter cartridge and the filter cartridge may be changed by separating the housing halves to gain access thereto.

15. A coolant filter assembly as defined in claim 14 wherein the spider member further comprises an outer cylindrical wall adjacent to and supported by the central portion of the assembled housing halves, and a plurality of arms extending radially inwardly from the cylindrical outer wall to a tubular wall, the filter cartridge being encircled and supported by the tubular wall of the spider member.

16. A coolant filter assembly as defined in claim 15 wherein the cylindrical sidewall of the cartridge shell defines an annular shoulder which butts against the tubular wall of the spider member to position the filter cartridge within the spider member.

17. A coolant filter assembly as defined in claim 16 wherein the housing halves are telescopically received together in overlapping relationship.

18. A coolant filter assembly as defined in claim 17 wherein the second housing half is formed of a less rigid material than the first housing half, wherein the second housing half overlaps the first housing half and the coolant tight seal is established by clamping the less rigid material of the second housing half against the more rigid material of the first housing half.

19. A coolant filter assembly as defined in claim 14 wherein the end connector tubes of the housing halves are both stepped, each having a first larger diameter portion adjacent the transition portion and a second smaller diameter portion adjacent the first larger diameter portion, the smaller diameter portion of the end connector tube being adapted for connection in cooling systems having a similar smaller diameter radiator inlet hose and wherein the smaller diameter portion may be cut away to permit the larger diameter portion to be used in mounting the filter housing in cooling systems having a similar larger diameter radiator inlet hose.

20. A coolant filter assembly for use in an automobile cooling system including an engine block, a radiator, radiator outlet and inlet hoses and a pump for circulating the coolant therein, the coolant filter assembly comprising:
(A) a filter housing including first and second housing valves each comprising an end connector tube, a transition portion and a central portion, the housing halves being adapted for being removably attached together in a coolant tight seal with the central portions of the housing halves together forming a central portion of the filter housing which is enlarged with respect to the radiator inlet hose and the connector tubes being adapted to mount the filter housing in the cooling system with the coolant inlet flow path through the filter housing;
(B) a filter cartridge having a cartridge shell being open at one end to admit coolant, the cartridge shell being perforated with openings to permit coolant to exit, and filter material deployed within the cartridge shell for filtering coolant passing therethrough; and
(C) means removably supporting the filter cartridge in the central portion of the filter housing with the open end of the cartridge she-1 receiving the coolant flow, whereby the coolant filter assembly cleans the coolant and the filter cartridge can be removed and replaced when dirty, wherein the filter cartridge is sized to permit coolant flow around it in the central portion of the filter housing, whereby coolant flows both through and around the filter cartridge and coolant flow is maintained if the filter cartridge becomes clogged.

21. A coolant filter assembly as defined in claim 20 wherein the means removably supporting the filter cartridge in the central portion of the filter housing comprises a spider member including at least one arm extending radially inwardly from the assembled housing halves and a tubular wall mounted to the at least one arm, the tubular wall removably receiving and supporting the filter cartridge.

22. A coolant filter assembly as defined in claim 21 wherein the spider member further comprises an outer cylindrical wall adjacent to and supported by the central portion of the assembled housing halves, and a plurality of arms extending radially inwardly from the cylindrical outer wall to a tubular wall, the filter cartridge being encircled and supported by the tubular wall of the spider member.

23. A coolant filter assembly as defined in claim 22 wherein the sidewall of the cartridge shell defines an annular shoulder which butts against the tubular wall of the spider member to position the filter cartridge within the spider member.

24. A coolant filter assembly as defined in claim 23 wherein the housing halves are telescopically received together in overlapping relationship.

25. A coolant filter assembly as defined in claim 24 wherein the second housing half is formed of a less rigid material than the first housing half, wherein the second housing half overlaps the first housing half and the coolant tight seal is established by clamping the less rigid material of the second housing half against the more rigid material of the first housing half.

26. A coolant filter assembly as defined in claim 25 wherein the end connector tubes of the housing halves are both stepped, each having a first larger diameter portion adjacent the transition portion and a second smaller diameter portion adjacent the first larger diameter portion, the smaller diameter portion of the end connector tube being adapted for connection in cooling systems have a similar smaller diameter radiator inlet hose and wherein the smaller diameter portion may be cut away to permit the larger diameter portion to be used in mounting the filter housing the cooling systems having a similar larger diameter radiator inlet hose.

27. A coolant filter assembly as defined in claim 20 wherein the housing halves are telescopically received together in overlapping relationship.

* * * * *